Dec. 27, 1932.   C. F. RUDOLPH   1,892,165
TEMPERATURE CONTROL SYSTEM
Filed Nov. 20, 1930
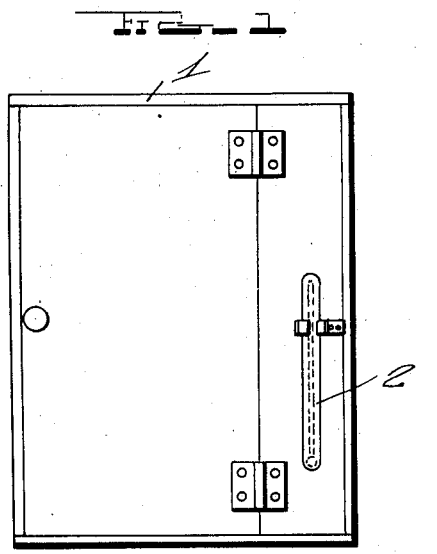
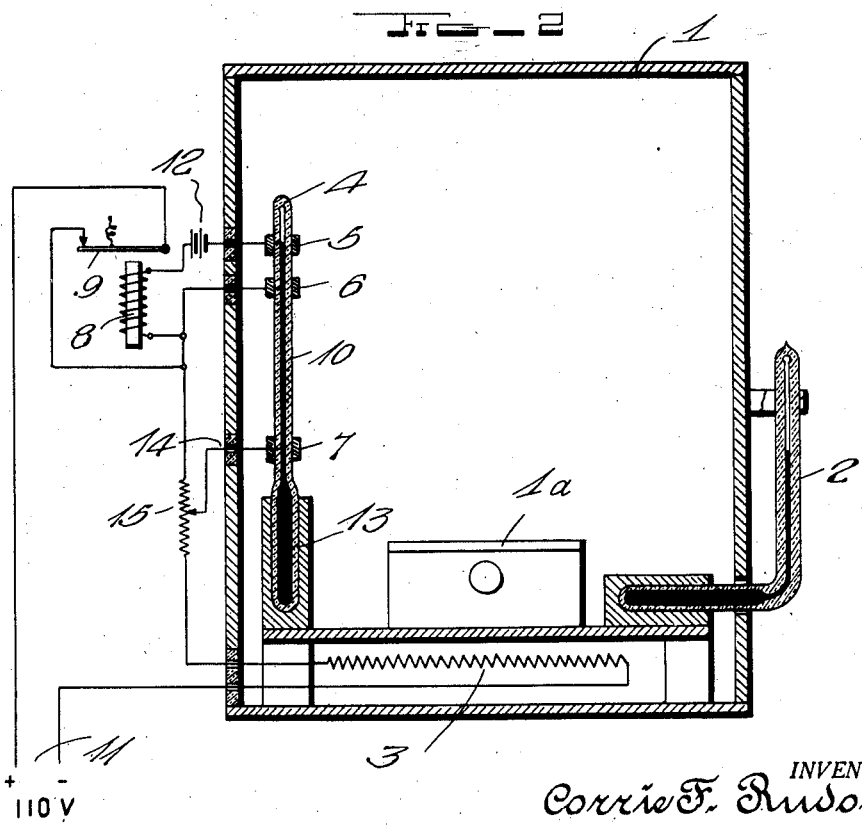
INVENTOR.
Corrie F. Rudolph
BY
ATTORNEY Patented Dec. 27, 1932

1,892,165

UNITED STATES PATENT OFFICE

CORRIE F. RUDOLPH, OF WASHINGTON, DISTRICT OF COLUMBIA

TEMPERATURE CONTROL SYSTEM

Application filed November 20, 1930. Serial No. 497,024.

My invention relates broadly to frequency control systems and more particularly to the method and apparatus for accurately controlling the temperature of frequency control elements in a frequency control system.

One of the objects of my invention is to provide a precision method for regulating the temperature of a frequency control system for correspondingly fixing the frequency of such a control system with a high degree of accuracy.

Another object of my invention is to provide a circuit arrangement for a thermostat having means for multiplying the degree of precision under which the thermostat functions for controlling the temperature of a frequency control element.

Other and further objects of my invention reside in the circuit arrangement of a thermostat for controlling the temperature of a frequency control element with a high degree of precision as will be set forth more fully in the specification hereinafter following by reference to the accompanying drawing, wherein:

Figure 1 is an elevational view of a frequency control cabinet which houses the temperature control apparatus of my invention; and Fig. 2 is a cross-sectional view through the temperature control cabinet of Fig. 1, showing the arrangement of the frequency control device therein and the temperature control apparatus constituting my invention.

In order to explain the principles of my invention, I have illustrated my invention in connection with a piezo electric crystal element, but it will be understood that a magnetostriction device or other form of frequency control element may be employed in carrying out the principles of my invention.

In order to accurately measure the temperature of a piezo electric crystal, the indicating thermometer should be as nearly as possible in the same mechanical relation to the source of heat as the crystal occupies, that is, the heat should traverse the same thickness of the same material in reaching the crystal as it does in reaching the bulb of the indicating thermometer in order that conditions may be identical upon both the controlling and the controlled apparatus. The equalization of the temperature gradient between the heater unit and the control thermostat will cause the mercury column in a control thermostat to continue to rise after the heater is cut off, likewise, the temperature of the crystal will rise. In order to reduce this swing or lag in temperature, I superimpose a high speed oscillation of an off and on period of the control thermometer, which is responsive to changes of surrounding temperature approximately every second instead of the present normal ten or fifteen seconds required for temperature regulation. This is accomplished by the application of an artificial heat to a section of the control thermostat mercury column which raises the temperature to approximately 60° Fahrenheit above the surrounding atmosphere. This heat is applied and cut off simultaneously with the main heater unit, and is accomplished by passing a current of electricity of suitable value through a portion of the mercury column by means of a shunt circuit which connects across a potentiometer or other equivalent source of current which can be applied simultaneously with the main heater current. This current raises the temperature of a section of the control thermostat instantly and cools off quickly after interruption of the source of current. The time required to cool off, however, is governed by the temperature of the surrounding atmosphere which in turn governs the period of relative on and off time of the main heater unit. On account of the higher frequency of the cycle of operation, it will be more sensitive to minute changes in ambient temperature and therefore, closer regulation of temperature is obtained.

Referring to the drawing, reference character 1 represents the temperature control cabinet for the piezo electric crystal which is carried within container 1a. Reference character 2 designates the indicating thermometer, 3 the main heater unit, 4 the control thermostat having contacts 5, 6 and 7, and a control relay 8 which through its contacts 9, applies current to the heater 3 and superheated section 10 of the mercury column from a source of current 11 such as the lighting mains. Another source of current is indicated at 12 for the operation of the relay coil 8. A potentiometer 15 is interposed in series with the heater 3 and the contacts 9 of control relay 8 and connected with the source 11. A tap 14 on potentiometer 15 regulates the amount of current which is bypassed through a portion of the mercury column to provide the thermal control thereof. When in operation the mercury column touches contact 5, a circuit is established through relay 8 which in turn interrupts current through heater 3 and section 10 immediately. The control thermostat begins to cool and contraction of mercury in bulb 13, if unaided, would break contact at 5, reestablishing current to heater 3 in the course of about ten seconds, but as section 10 is about 60° Fahrenheit above the surrounding temperature it will cool much quicker than bulb 13, therefore, the contraction of section 10 of the mercury column will cause the break at contact 5 and control will be effected at the high speed intervals of about one second each, likewise when current is reestablished in heater 3 and section 10, section 10 will heat much quicker than bulb 13, therefore, the expansion of section 10 of the mercury column will cause the closing of contact 5. However, section 10 cannot control a temperature that is above or below the limits of temperature variation permitted by the heat capacity of bulb 13, but operates to stabilize the temperature at a point midway between said limits.

I have found the temperature control system of my invention capable of precision regulation for frequency control systems. The artificial maintenance of the position of the mercury column above a predetermined limit enables slight changes in temperature to bring about the required control of the heater circuit. The control is thus rendered more sensitive to minute changes in ambient temperature and therefore allows closer temperature regulation.

While I have described a preferred embodiment of my invention I desire that it be understood that modifications may be made and that no limitations upon my invention are intended other than are imposed by the scope of the appended claims.

What I claim as new and desire to secure by Letters Patent of the United States is as follows:

1. In a temperature control system for frequency determining elements the combination of a thermostat comprising a heat responsive element, a heating member located adjacent said frequency determining element, a power source, a series circuit connecting said heating member with said power source, a relay disposed in said series circuit, connections between said relay and said thermostat for controlling the operation of said relay, and a shunt path through the heat responsive element of said thermostat connected with said series circuit for preconditioning the operation of said thermostat according to slight changes in ambient temperature adjacent said frequency determining element.

2. A temperature control system for frequency determining elements comprising in combination, a heater member, a thermostat comprising a heat responsive element, a power source, a relay including a source of current and an actuating winding and a pair of contacts, a series circuit extending from said power source through the contacts on said relay and said heater member, connections between said actuating winding and said thermostat, and means connected in said series circuit and adjustably connected to a portion of said thermostat for establishing a shunt path through the heat responsive element of said thermostat under predetermined temperature conditions for preconditioning said thermostat and rendering said thermostat sensitive to slight changes in ambient temperature adjacent said frequency determining element for controlling the energization of said actuating winding and correspondingly controlling the time period during which said heater element is energized from said power source, the path through said thermostat of the current delivered to the actuating winding of said relay being different from the shunt path through the heat responsive element of said thermostat connected to said series circuit.

3. A temperature control system comprising in combination an electric heater element, a thermostat of the mercury column type comprising an insulating tubular member containing a column of conductive liquid, a plurality of connectors for making contact with the liquid column of said thermostat at different positions along said tubular member, a relay including a source of current and an actuating winding and a pair of contacts, a power source, a series circuit extending from said power source through the contacts of said relay and through said heater element, connections between the actuating winding of said relay and two of the connectors on said tubular member, and means connected in said series circuit and connected for delivering to two of the connectors on said tubular member a portion of the energy flowing in said series circuit of value sufficient to heat the column of conducting liquid in said tubular member to a temperature substantially above the ambient temperature.

4. A temperature control system comprising in combination an electric heater element, a thermostat of the mercury column type comprising an insulating tubular member containing a column of conductive liquid, a plurality of connectors for making contact with the liquid column of said thermostat at different positions along said tubular member, a relay including a source of current and an actuating winding and a pair of contacts, a power source, a series circuit extending from said power source through the contacts of said relay and through said heater element, connections between the actuating winding of said relay and two of the connectors on said tubular member, and means connected in said series circuit and connected for delivering to two of the connectors on said tubular member a portion of the energy flowing in said series circuit of value sufficient to heat the column of conducting liquid in said tubular member to a temperature substantially above the ambient temperature, at least one of the connectors on said tubular member to which said means delivers a portion of the energy flowing in said series circuit being different from the connectors on said column to which the actuating winding of said relay are connected.

CORRIE F. RUDOLPH.